United States Patent [19]

Ochi et al.

[11] Patent Number: 5,221,298
[45] Date of Patent: Jun. 22, 1993

[54] WET EXHAUST GAS DESULFURIZATION APPARATUS AND METHOD

[75] Inventors: Eiji Ochi; Kiyoshi Okazoe, both of Tokyo; Naohiko Ukawa, Hiroshima; Susumu Okino, Hiroshima; Masakazu Onizuka, Hiroshima, all of Japan

[73] Assignee: Mitsubishi Jukogyo Kabushiki Kaisha, Tokyo, Japan

[21] Appl. No.: 827,216

[22] Filed: Jan. 30, 1992

[30] Foreign Application Priority Data

| Jan. 30, 1991 | [JP] | Japan | 3-9972 |
| May 14, 1991 | [JP] | Japan | 3-109064 |
| May 21, 1991 | [JP] | Japan | 3-116188 |

[51] Int. Cl.⁵ ............... B01D 47/02; B01D 53/18
[52] U.S. Cl. ...................... 55/241; 55/242; 55/256
[58] Field of Search .......... 55/73, 95, 240, 241, 55/244, 256, 242

[56] References Cited

U.S. PATENT DOCUMENTS

| 592,579 | 10/1897 | Balkam | 55/256 X |
| 1,363,331 | 12/1920 | Livermore | 55/244 |
| 1,527,010 | 2/1925 | Powell | 55/256 |
| 2,385,077 | 9/1945 | Harker et al. | 55/241 X |
| 2,812,167 | 11/1957 | Wroth | 55/244 X |
| 3,172,725 | 3/1965 | Rugh | 55/240 X |
| 3,266,224 | 8/1966 | Ferretti | 55/240 X |
| 3,815,332 | 6/1974 | Bobrowsky et al. | 55/244 X |
| 3,833,508 | 9/1974 | Austin et al. | 55/73 X |
| 3,966,878 | 6/1976 | Pausch et al. | 423/242 |
| 4,099,925 | 7/1978 | Yanagioka et al. | 55/73 X |
| 4,368,060 | 1/1983 | Yanagiako et al. | 55/95 X |
| 4,470,830 | 9/1984 | Aubert | 55/95 X |
| 4,533,522 | 8/1985 | Leimkühler | 55/244 X |
| 4,778,483 | 10/1988 | Martin et al. | 55/256 X |
| 4,886,531 | 12/1989 | Lütze | 55/244 |
| 5,078,759 | 1/1992 | Kira | 55/256 X |

FOREIGN PATENT DOCUMENTS

| 1127930 | 4/1962 | Fed. Rep. of Germany | 55/244 |
| 55-029192 | 1/1980 | Japan | 55/244 |
| 56-102922 | 8/1981 | Japan | 55/244 |
| 3403705 | 8/1985 | Netherlands . | |
| 8807836 | 11/1988 | Netherlands . | |
| 0865348 | 9/1981 | U.S.S.R. | 55/244 |
| 0777924 | 6/1986 | U.S.S.R. | 55/244 |
| 2018156 | 10/1979 | United Kingdom | 55/240 |

Primary Examiner—Robert Spitzer
Attorney, Agent, or Firm—Jacobson, Price, Holman & Stern

[57] ABSTRACT

A wet exhaust gas desulfurization apparatus includes a housing, an absorbing solution (3, B) stored in the lower portion of the housing, a flue (1, 2, 11, 12, 21, 25) above the surface of the absorbing solution, and a partition plate (4, 15, 25) for dividing the flue into gas inlet and outlet portions. Exhaust gas is introduced as an untreated combustion gas from a space above an absorbing solution (3) divided by a partition plate (4) into the wet exhaust gas desulfurization apparatus, the lower edge (5) of the partition plate is immersed in the solution, pressure of the exhaust gas lowers the upper level (6) of the solution on the upper side of the plate to a level (6') through which the gas passes and flows under the partition plate in contact with the solution leaving the solution on the other side of the plate and then discharges through a space above the absorbing solution on the other side of the partition plate. The plate may be raised and lowered by a rack (4') and pinion (4") device, and water jet devices (29) may be used to wash absorbing solution off the surfaces (27, 28) of the plate continuously or intermittently.

14 Claims, 7 Drawing Sheets

WET EXHAUST GAS DESULFURIZATION APPARATUS AND METHOD

BACKGROUND OF THE INVENTION

The present invention relates to a wet exhaust gas desulfurization apparatus and a wet exhaust gas desulfurization method using this apparatus.

Figure 17:
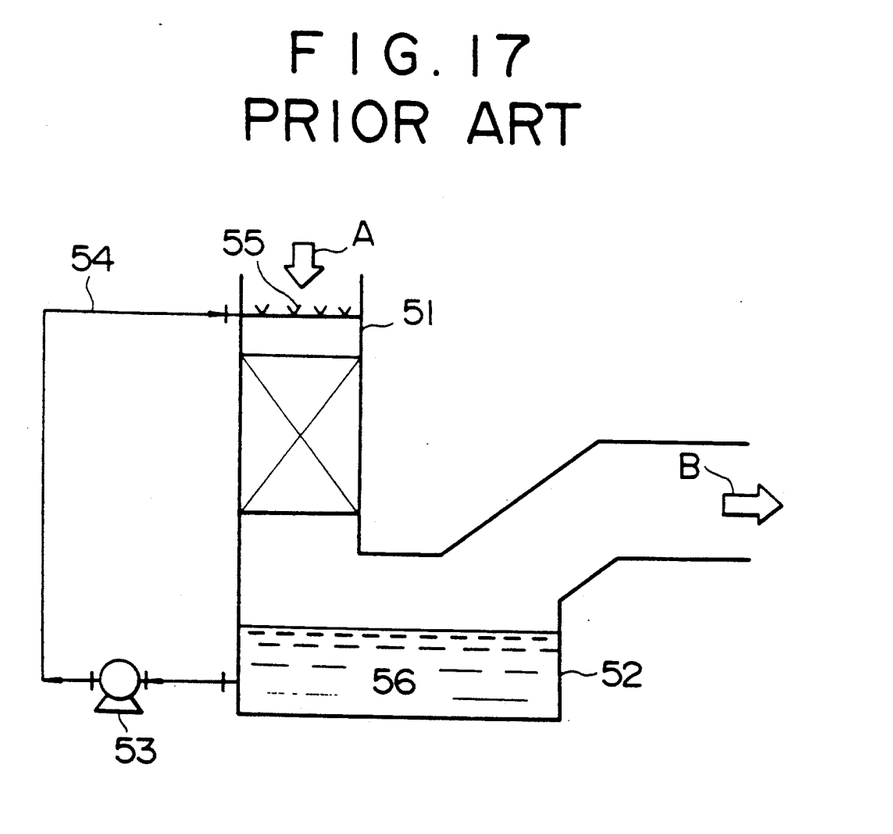
FIG. 17 is a schematic explanatory view of one embodiment of a conventional wet exhaust gas desulfurization apparatus.

One embodiment of a conventional wet exhaust gas desulfurization apparatus and a wet exhaust gas desulfurization method using the conventional apparatus will first be described with reference to FIG. 17.

A combustion exhaust gas A introduced into an absorption tower 51 is brought into contact with an absorbing solution sprayed through a nozzle 55 via a circulating pump and a circulating line 54 from an absorbing solution tank 52, whereby $SO_2$ in the combustion exhaust gas A is absorbed and removed by the absorbing solution 56. The thus treated exhaust gas is then discharged as a desulfurized exhaust gas B from the system.

BRIEF SUMMARY OF THE INVENTION

In the above-mentioned conventional wet exhaust gas desulfurization apparatus, it is required that the solution is pumped up by the use of a pump or the like so as to spray the absorbing solution. In consequence, some facilities and additional power are necessary, and the height of the apparatus has to be high.

The present invention provides a wet exhaust gas desulfurization apparatus by which the above-mentioned problems of the conventional technique can be solved and which requires neither the facilities for pumping up the absorbing solution nor the additional power and which permits decreasing the height of the apparatus. The present invention also provides a wet exhaust gas desulfurization method which utilizes this apparatus.

The present invention provides a wet exhaust gas desulfurization apparatus which comprises a housing, an absorbing solution stored in the lower portion of the housing, and a partition plate whose lower end portion is immersed in the absorbing solution and whose upper portion divides a flue positioned above the surface of the absorbing solution. The present invention also provides a wet exhaust gas desulfurization method which comprises the steps of introducing an untreated combustion gas into the wet exhaust gas desulfurization apparatus from a space above one of the two sections of the absorbing solution divided by a partition plate, sinking the lower end portion of the partition plate into the solution so as to bring the exhaust gas into contact with the solution, and then discharging the gas through a space above the other section of absorbing solution divided by the partition plate.

In the present invention, the partition plate is disposed so that the combustion exhaust gas may be introduced into the absorbing solution in the absorbing solution tank, whereby the combustion exhaust gas is brought into contact with the absorbing solution and $SO_2$ is removed from the combustion exhaust gas. Therefore, the amount of $SO_2$ to be removed (desulfurization ratio) and the amount of the exhaust gas to be treated can be easily adjusted by changing the arrangement conditions and the shape of the partition plate, as described hereinafter.

(1) The gas-solution contact time can be adjusted by altering the immersion depth of the partition plate in the absorbing solution.

(2) The length of the lower edge line of the partition plate along which the combustion exhaust gas is passed can be adjusted by folding or curving the lower end portion of the partition plate.

(3) The size of bubbles in the absorbing solution or the like can be changed by forming the lower edge of the partition plate into a sawtooth shape and by altering the shape and the size of the sawteeth or altering the thickness of the edge portion, whereby the contact efficiency can be adjusted.

According to the present invention, neither facilities nor power for pumping up the absorbing solution are required, and the height of the apparatus can be reduced.

In addition, the desulfurization ratio and the amount of the combustion exhaust gas to be treated can also be adjusted relatively easily by changing the shape and the size of the partition plate and by altering the immersion depth of the partition plate in the absorbing solution.

According to the present invention, in order to make the gas stream uniform and stabilize the desulfurization ratio and eliminate pressure fluctuation, the above-mentioned wet exhaust gas desulfurization apparatus can be provided with a plurality of sectional plates crossing the partition plate so that the lower edge of each sectional plate may be at a position lower than the lower edge of the partition plate and so that the upper edge of each sectional plate may be at a position higher than the surface of the absorbing solution.

According to the wet exhaust gas desulfurization apparatus of the present invention which is equipped with the above-mentioned sectional plates, it is possible to control the turbulence of the absorbing solution surface which tends to occur when the exhaust gas is introduced into the solution from one side of the flue divided by the partition plate, passed under the partition plate, and then discharged from the solution surface on the other side.

In consequence, the deterioration of the desulfurization ratio and the pressure fluctuation can be eliminated which are attributable to the unbalance of the gas stream due to the turbulence of the absorbing solution surface.

Moreover, in the method of the present invention, in order to make the gas stream uniform and prevent increases of the pressure loss in the gas stream and the deposition of scale which will cause the partition plate to corrode, water can be intermittently or continuously jetted to a surface of the partition plate at a position above the absorbing solution surface.

In addition, water can also be jetted to the whole surface of the partition plate above the absorbing solution by the action of a water jet device.

According to the present invention, by jetting water to the partition plate in this way, if splashes which occur as the combustion exhaust gas passes under the partition plate adhere to the surface of the partition plate, the splashes can be washed away intermittently or continuously. Moreover, the adhesion of the splashes can be prevented in a wide range by operating the water jet device.

Accordingly, jetting water to the partition plate can solve problems such as the unbalance of the gas stream and increases of the pressure loss in the gas stream which are attributable to the scale, and a problem such as the release of the untreated combustion gas which is due to the corrosion and perforation of the partition plate.

BRIEF DESCRIPTION OF THE DRAWINGS

This invention will now be described in detail with reference to the accompanying drawings wherein.

DETAILED DESCRIPTION OF PREFERRED EMBODIMENTS

One embodiment of the present invention will be described with reference to FIGS. 1 to 8.

Figure 1:
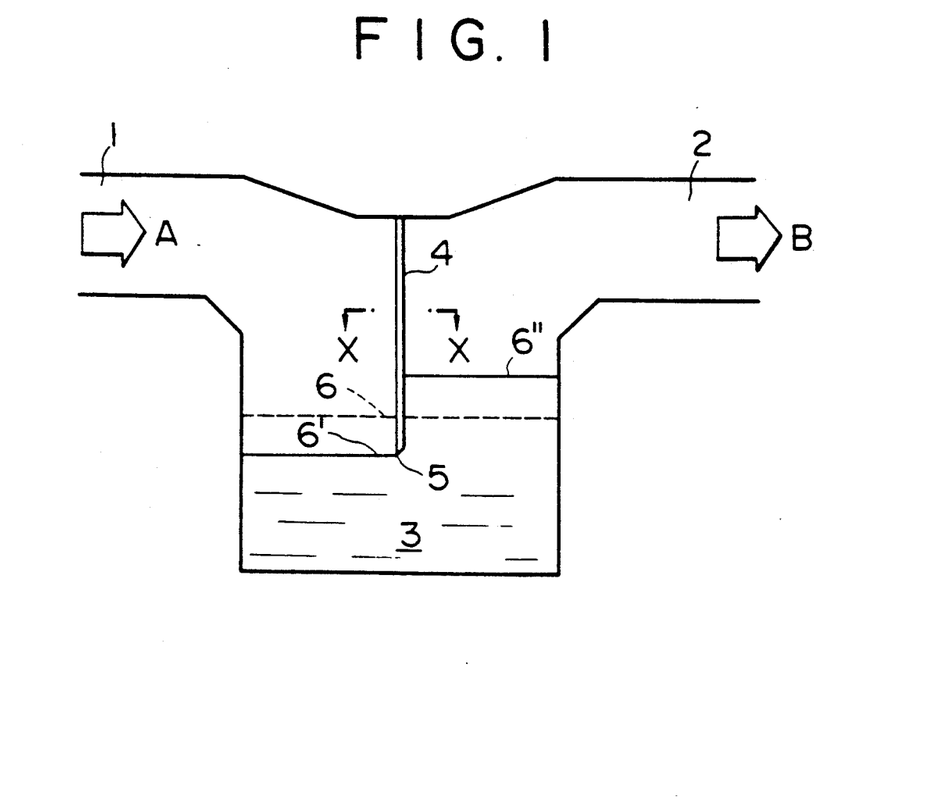
FIG. 1 is a schematic illustrating one embodiment of a wet exhaust gas desulfurization apparatus according to the present invention.

FIG. 1 shows the whole view of an apparatus of the present invention and a mode of operation thereof In this drawing, reference numeral 1 is an inlet flue, numeral 2 is an outlet flue, 3 is an absorbing solution, 4 is a partition plate, and 5 is a lower edge of the partition plate. In FIG. 1, a combustion exhaust gas A pushes down a surface 6 of the absorbing solution to a lower surface level 6' thereof by its pressure. The gas A passes under the lower edge of the partition plate 4, comes in contact with the absorbing solution 3, and rises through the solution, while $SO_2$ contained in the combustion exhaust gas A is absorbed by the absorbing solution 3.

The desulfurized exhaust gas B from which $SO_2$ has been removed is passed through the surface 6" of the absorbing solution on the opposite side of the partition plate 4, and is then discharged from the system.

Figure 2:
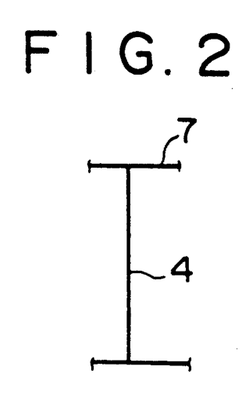
FIG. 2 is a schematic cross-sectional view taken along the line X—X on a partition plate of the apparatus in FIG. 1.
Figure 3:
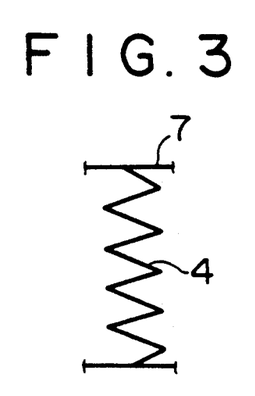
FIG. 3 is a view similar to FIG. 2 taken along the line X—X on another embodiment of the partition plate of the apparatus in FIG. 1.
Figure 4:
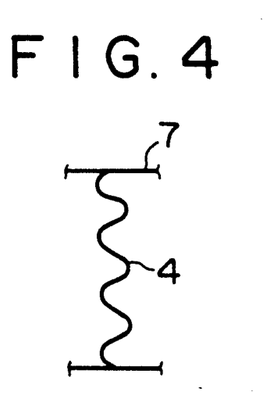
FIG. 4 is a view similar to FIG. 2 taken along the line X—X on still another embodiment of the partition plate of the apparatus in FIG. 1.
Figure 5:
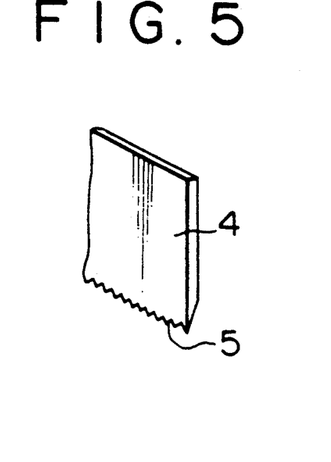
FIG. 5 is a partial perspective view showing one shape of the lower edge of the partition plate in the apparatus in FIG. 1.
Figure 6:
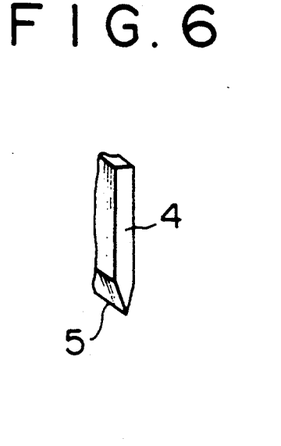
FIG. 6 is a view similar to FIG. 5 of another shape of the lower edge of the partition plate in the apparatus in FIG. 1.
Figure 7:
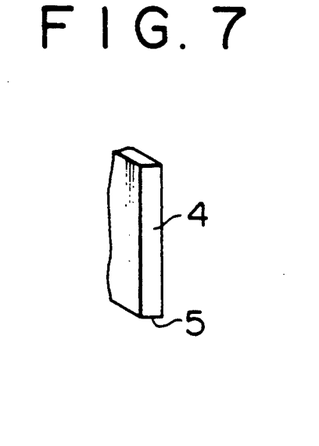
FIG. 7 is a view similar to FIG. 5 of still another shape of the lower edge of the partition plate in the apparatus in FIG. 1.

FIGS. 2, 3 and 4 show examples of various cross-sectional shapes of the partition plate 4 along the line X—X in FIG. 1. In these drawing, reference numeral 7 is a flue wall. Furthermore, FIGS. 5, 6 and 7 are perspective views illustrating examples of various shapes of the lower edge of the partition plate 4.

Figure 8:
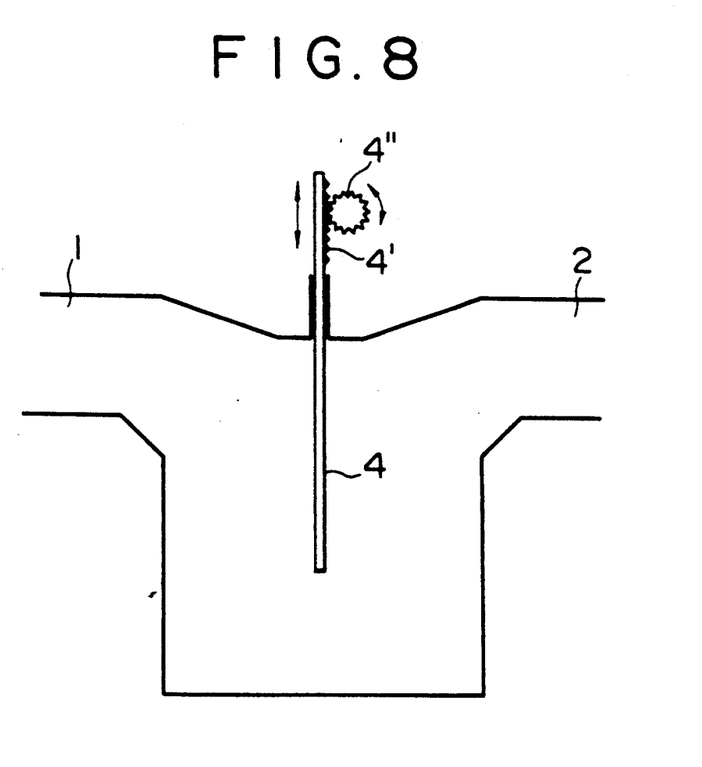
FIG. 8 is a view similar to FIG. 1 of a mechanism for adjusting the immersion depth of the partition plate in an absorbing solution in the apparatus of FIG. 1.

FIG. 8 shows one example of the construction of the present invention whereby the immersion depth of the partition plate in the absorbing solution can be adjusted from the outside of the apparatus. In this construction, a rack gear 4' is attached to the partition plate, and this plate can be moved upward and downward by a pinion gear 4" engaging the rack gear. The movement of the partition plate can be carried out by means of a remote control device.

Another embodiment of the present invention will be described with reference to FIGS. 9 to 12.

Figure 9:
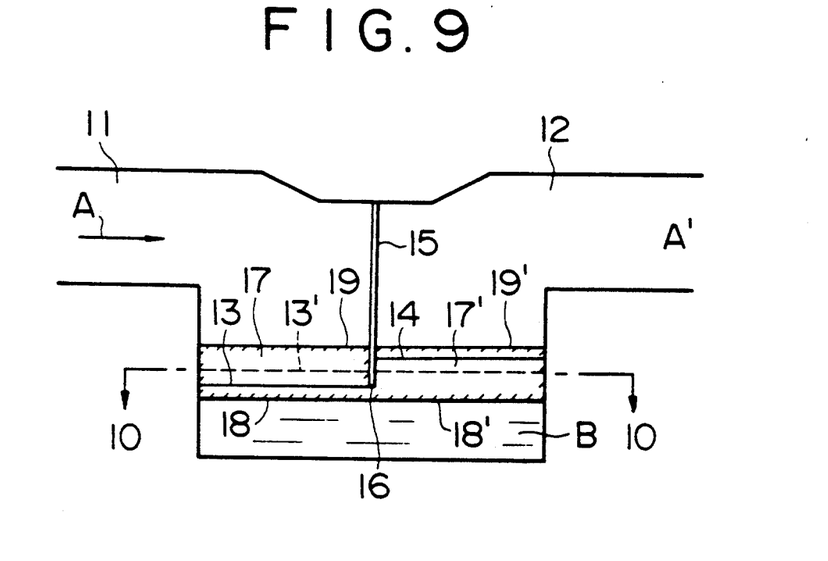
FIG. 9 is a view similar to FIG. 1 of another embodiment of the present invention.

FIG. 9 shows the whole of the arrangement of the respective parts in the present invention, and in this drawing, the untreated exhaust gas A coming through the inlet flue 11 pushes down a surface 13' of the absorbing solution to a surface level 13 of the same solution by its pressure when no gas passes through, and passes under a lower edge 16 of a partition plate 15, and comes in gas-liquid contact with the absorbing solution B, and goes through a solution surface 14 on the side of an outlet flue 12, and passes through the outlet flue 12, and then leaves the system as a treated exhaust gas A'.

On the side where the untreated exhaust gas A is introduced, a plurality of sectional plates 17 transverse to the partition plate 15 are disposed so that a lower edge 18 of each sectional plate 17 may be at a position lower than a lower edge 16 of the partition plate 15 and so that an upper edge 19 of each sectional plate 17 may be at a position higher than the surface 13 of the absorbing solution. Also on the side of the outlet flue 12, a plurality of similar sectional plates 17' are disposed so that a lower edge 18' of each sectional plate 17' may be at a position lower than the surface 14 of the absorbing solution and so that an upper edge portion 19' of each sectional plate 17' may be at a position higher than the solution surface 14.

Figure 10:
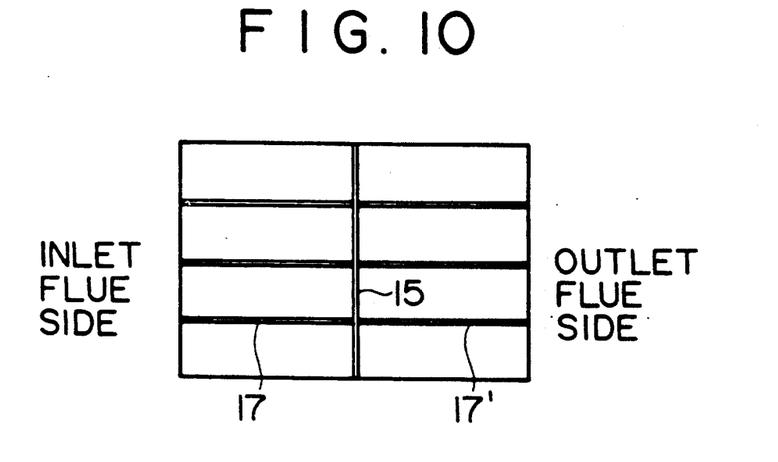
FIG. 10 is a schematic cross-sectional taken along the line 10—10 in FIG. 9.

FIG. 10 shows a cross section cut along line 10—10 in FIG. 9.

Figure 11:
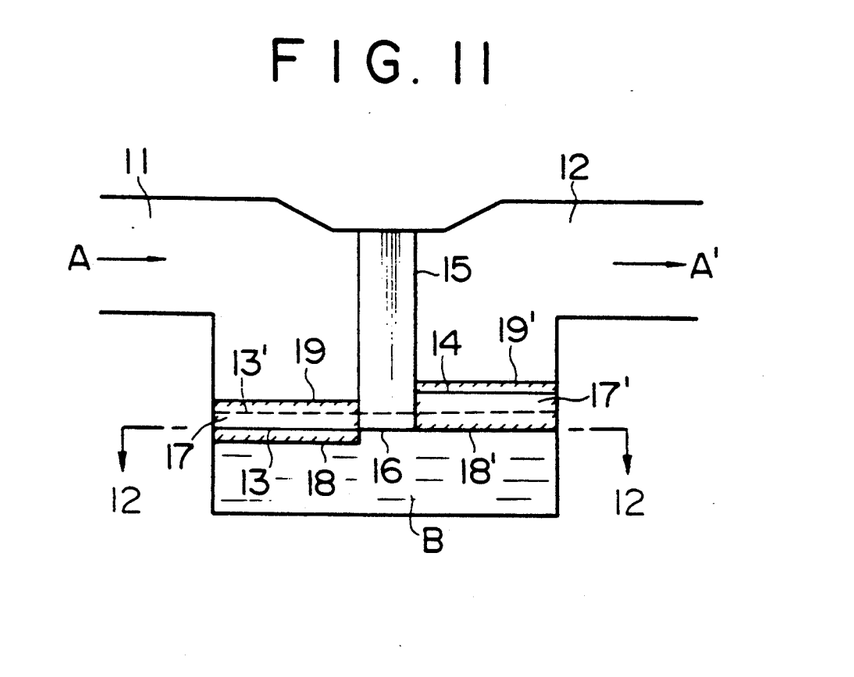
FIG. 11 is a view similar to FIG. 1 of still another embodiment of the present invention.

FIG. 11 shows an embodiment in which the partition plate 15 is formed in a zigzag shape, and the sectional plates 17 and 17' on the exhaust gas inlet and outlet sides are arranged transversely to the zigzag partition plate 15 at the tips thereof.

Figure 12:
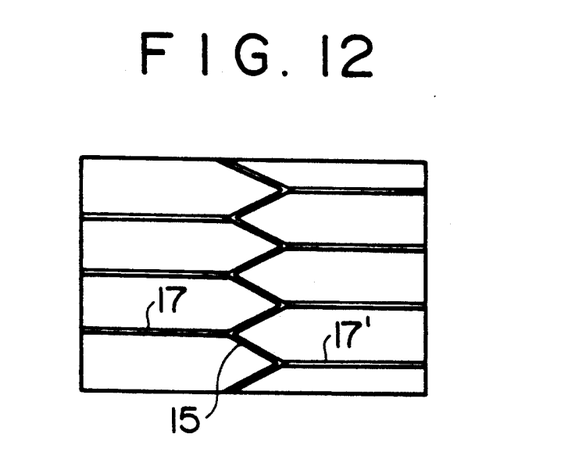
FIG. 12 is a view similar to FIG. 10 taken along the line 12—12 in FIG. 11.

FIG. 12 shows a cross section cut along line D—D in FIG. 11.

Still another embodiment of the present invention will be described with reference to FIGS. 13 to 16.

Figure 13:
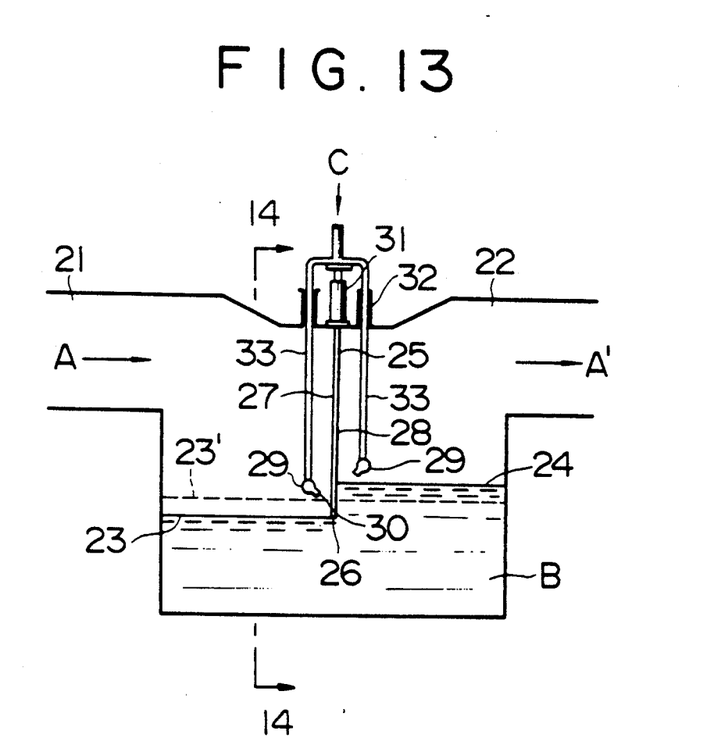
FIG. 13 is a view similar to FIG. 1 of still another embodiment of the present invention.

FIG. 13 is an explanatory view illustrating the whole of the arrangement of the present invention. In this drawing, the untreated exhaust gas A coming through an inlet flue 21 pushes down a surface 23' of the absorbing solution to a surface level 23 of the solution by its pressure when no gas passes through, and passes under a lower edge 26 of a partition plate 25, and comes in gas-liquid contact with the absorbing solution B, and goes through a solution surface 24 on the side of an outlet flue 22, passes through the outlet flue 22, and then leaves the system as a treated exhaust gas A'. When the untreated exhaust gas A passes under the lower edge 26 of the partition plate 25 and when the treated exhaust gas A' passes out through surface 24 of the absorbing solution, splashing occurs and part of the splashes adhere to an inlet side surface 27 and an outlet side surface 28 of partition plate 25. In order to wash away the adhered splashes, water jet devices 29 are disposed which have openings 30 facing toward the inlet side surface 27 and the outlet side surface 28 of the partition plate, respectively. Washing water C coming through pipes 33 is intermittently or continuously jetted onto inlet side surface 27 and outlet side surface 28 of partition plate 25 through openings 30 of water jet devices 29. In FIG. 13, 31 is a driving device of the partition plate, and 32 is a sealing material.

Figure 14:
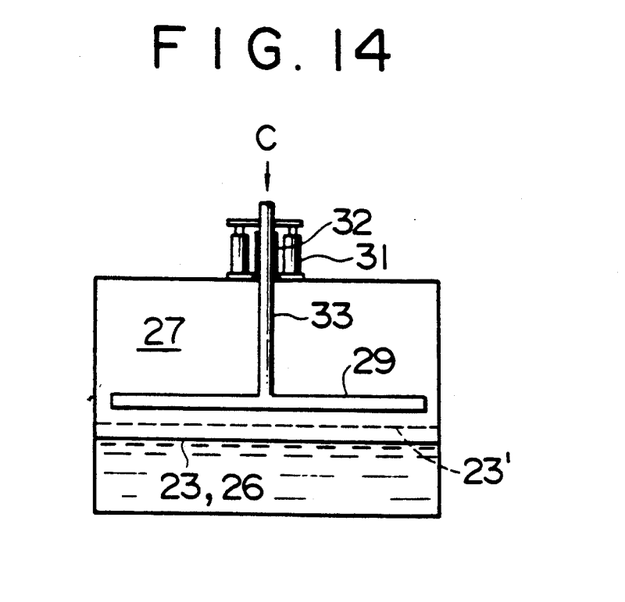
FIG. 14 is a schematic cross-sectional view taken along the line 14—14 in FIG. 13.

FIG. 14 shows an embodiment of the water jet device 29 seen from the direction of line 14—14 in FIG. 13.

FIGS. 13 and 14 show embodiments in which the washing water C is jetted in a wide range in a rising-/falling manner.

Figure 15:
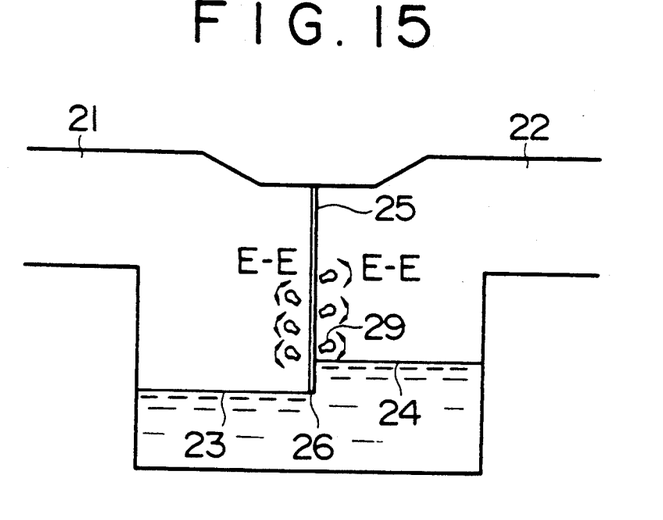
FIG. 15 is a view similar to FIG. 1 showing one embodiment of a multi-stage type water jet device which can be used in the present invention.

FIG. 15 shows an embodiment of the multi-stage type water jet device 29 which can drive in the direction of the arrow lines E—E.

Figure 16:
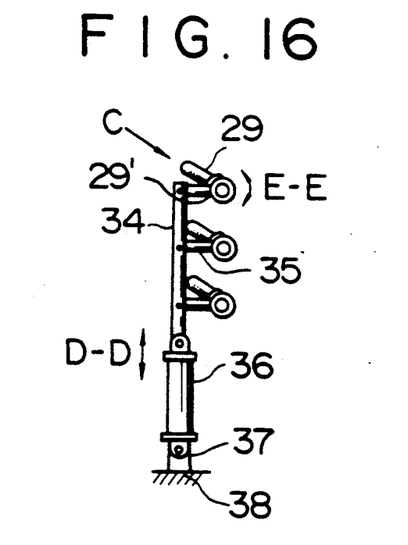
FIG. 16 is an elevational view illustrating the construction of the multi-stage type water jet device in FIG. 15.

FIG. 16 is an explanatory view illustrating the structure of driving members in FIG. 15, and in this drawing, an edge 29' of each water jet device 29 is fixed to a link 35, and this link 35 is connected to a rod 34 connected to a driving device 36. This driving device 36 is expanded and reciprocated in directions of each arrow line D—D to move the water jet device 29 in the direction of arrow line E—E.

We claim:

1. In a wet exhaust gas desulfurization apparatus including a housing, an absorbing solution having an upper surface stored in a lower portion of said housing, and a partition plate having a lower end portion immersed in the absorbing solution and an upper portion dividing a gas flow flue positioned above the upper surface of said absorbing solution into an inlet flue and an outlet flue, the improvement comprising:
    a lower edge on said partition plate immersed in said absorbing solution;
    a plurality of sectional plates disposed substantially transversely to said partition plate;
    a lower edge on each sectional plate, at least said lower edges on some of said sectional plates being positioned lower than said lower edge of said partition plate; and
    an upper edge on each sectional plate positioned higher than said upper surface of said absorbing solution.

2. The apparatus as claimed in claim 1 and further comprising:
    water jet means for directing at least one jet of water continuously onto at least one portion of said partition plate above the upper surface of said absorbing solution.

3. The apparatus as claimed in claim 2 wherein:
    said water jet means comprises means for directing water onto the entire surface of said partition plate above the upper surface of said absorbing solution.

4. The apparatus as claimed in claim 3 wherein:
    said water jet means comprises a plurality of water jets.

5. The apparatus as claimed in claim 2 wherein:
    said water jet means comprises a plurality of water jets.

6. The apparatus as claimed in claim 1 and further comprising:
    water jet means for directing at least one jet of water intermittently onto at least one portion of said partition plate above the upper surface of said absorbing solution.

7. The apparatus as claimed in claim 6 wherein:
    said water jet means comprises means for directing water onto the entire surface of said partition plate above the upper surface of said absorbing solution.

8. The apparatus as claimed in claim 7 wherein:
    said water jet means comprises a plurality of water jets.

9. The apparatus as claimed in claim 6 wherein:
    said water jet means comprises a plurality of water jets.

10. The apparatus as claimed in claim 6 wherein:
    said lower edge of said partition plate is substantially pointed.

11. The apparatus as claimed in claim 6 wherein:
    said lower edge of said partition plate is substantially serrated.

12. The apparatus as claimed in claim 1 and further comprising:
    means engaging said partition plate for raising and lowering said partition plate to vary the depth of immersion of said lower edge of said partition plate in said absorbing solution.

13. The apparatus as claimed in claim 1 wherein:
    said partition plate has a substantially corrugated horizontal cross-sectional shape.

14. The apparatus as claimed in claim 13 wherein:
    said sectional plates have inner edges connected to ridges of said corrugation.

* * * * *